(12) United States Patent
Fleck et al.

(10) Patent No.: US 6,405,273 B1
(45) Date of Patent: Jun. 11, 2002

(54) DATA PROCESSING DEVICE WITH MEMORY COUPLING UNIT

(75) Inventors: Rod G. Fleck, Mountain View; Klaus Oberlaender, San Jose, both of CA (US); Gigy Baror, Ramat Gan (IL); Alfred Eder, Friedberg (DE); Le Trong Nguyen, Monte Sereno, CA (US)

(73) Assignee: Infineon Technologies North America Corp., San Jose, CA (US)

( * ) Notice: Subject to any disclaimer, the term of this patent is extended or adjusted under 35 U.S.C. 154(b) by 0 days.

(21) Appl. No.: 09/192,170

(22) Filed: Nov. 13, 1998

(51) Int. Cl.[7] ............................................. G06F 13/00
(52) U.S. Cl. ...................................................... 710/131
(58) Field of Search ................................. 710/130–131

(56) References Cited

U.S. PATENT DOCUMENTS 5,307,506 A * 4/1994 Colwell et al. ............. 395/800

* cited by examiner

Primary Examiner—John A. Follansbee
(74) Attorney, Agent, or Firm—Fish & Richardson P.C.

(57) ABSTRACT

A data processing unit is disclosed with a register file having a plurality of registers. A memory having a plurality of n-bit input/output ports, and a coupling unit for coupling the memory with the register file, a memory address and select unit for addressing the memory banks are provided. The coupling unit comprises a bus having a bus width of at least 2n-bits forming at least a first and second sub-bus, first couplers for coupling each memory bank or the register file selectively with one of the sub-busses, and second couplers for coupling the register file or the memory banks with the bus.

16 Claims, 12 Drawing Sheets

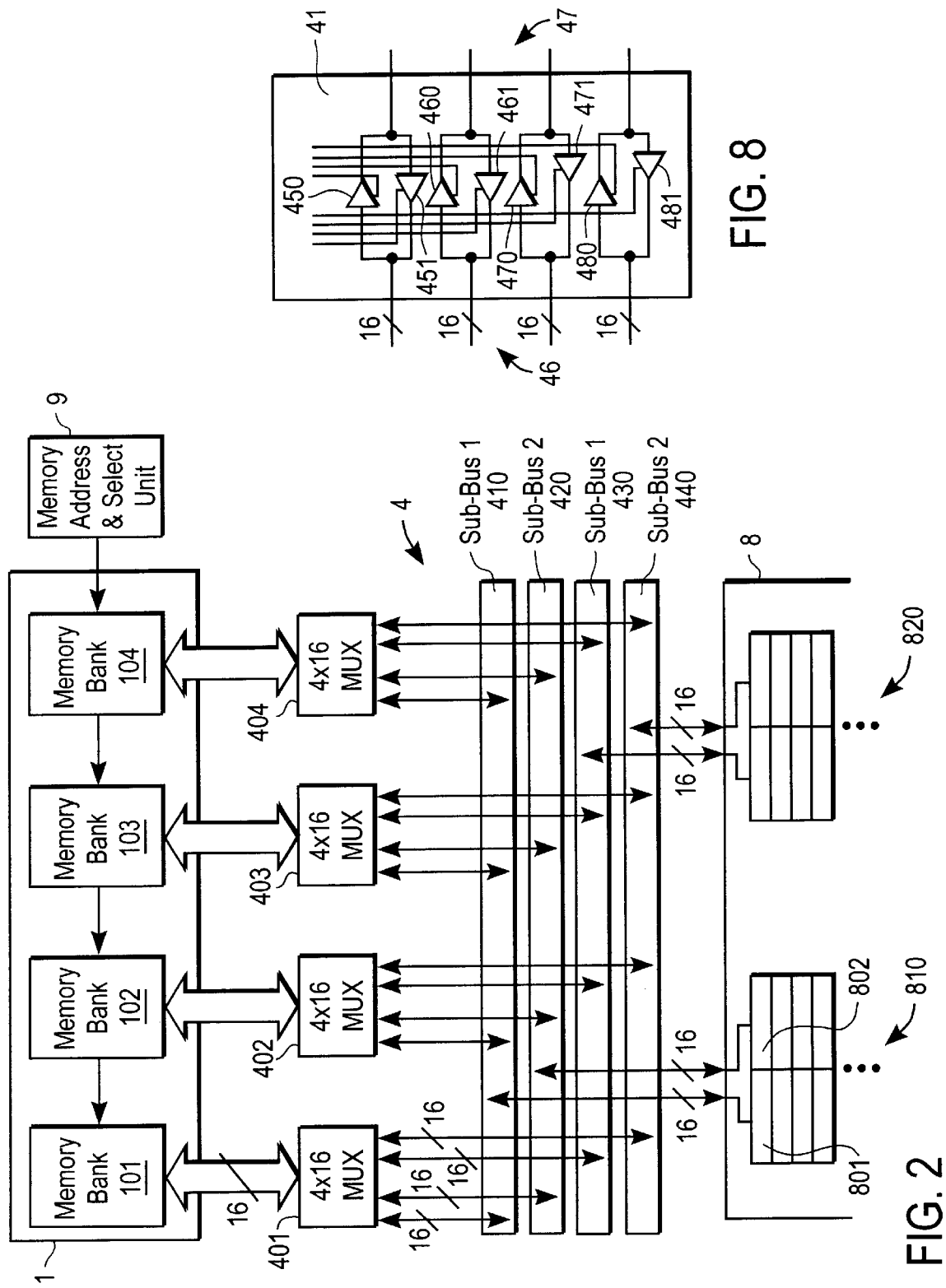

DATA PROCESSING DEVICE WITH MEMORY COUPLING UNIT

BACKGROUND OF THE INVENTION

The present invention relates to a data processing device with a memory coupling unit. Data processing devices, such as microprocessors or microcontrollers comprise one or more register files for intermediate storage of data and addresses. For processing of data and/or addresses, the content of these registers has to be loaded and stored into a memory subsystem which can consist of standard memory and/or a cache memory. Usually, an interface between the register file and the memory subsystem is provided which is controlled by respective control units of the microprocessor during load and store cycles.

Modern microprocessors provide superscalar design with the ability of processing multiple instructions in parallel. Furthermore, in digital signal processing some instructions require multiple data which is processed during execution of the respective instruction. The interface between the register file and the memory can be a bottleneck within the processing path and slow down the over all speed of the respective microprocessor.

SUMMARY OF THE INVENTION

It is therefore an object of the invention to provide an interface between a register file and a memory system with high speed access to data stored in the memory system.

This object is achieved by a data processing unit with a register file having a plurality of registers, a memory having a plurality of n-bit input/output ports, and a coupling unit for coupling the memory with the register file, a memory address and select unit for addressing the memory banks. The coupling unit comprises a bus having a bus width of at least 2n-bits forming at least a first and second sub-bus, first couplers for coupling each memory bank or the register file selectively with one of the sub-busses, and second couplers for coupling the register file or the memory banks with the bus.

In another embodiment of the present invention, the data processing unit comprises a first and a second register file having a plurality of registers, a memory having a plurality of n-bit input/output ports, a bus having a bus width of at least 2n-bits forming at least a first and second sub-bus, first couplers for coupling each memory bank selectively with one of the sub-busses, second couplers for coupling the first register file with the bus, and third couplers for coupling the second register file with the bus.

In yet another embodiment a data processing unit comprises a first and a second register file having a plurality of registers, a first and second memory each having a plurality of n-bit input/output ports, a first bus having a bus width of at least 2n-bits forming at least a first and second sub-bus, first couplers for coupling each memory bank of said first memory selectively with one of the sub-busses, second couplers for coupling said first register file with said first bus, a second bus having a bus width of at least 2n-bits forming at least a third and fourth sub-bus, third couplers for coupling each memory bank of said second memory selectively with one of the sub-busses, fourth couplers for coupling the second register file with the second bus, and a bus-coupler for coupling the first and second bus.

BRIEF DESCRIPTION OF THE DRAWINGS

FIG. 2 shows a block diagram of a second embodiment including a memory sub-system coupled with a register file according to the present invention, FIG. 8 shows the bus-bridge according to FIG. 4 in more detail.

DETAILED DESCRIPTION OF THE PREFERRED EMBODIMENT

Figure 1B:
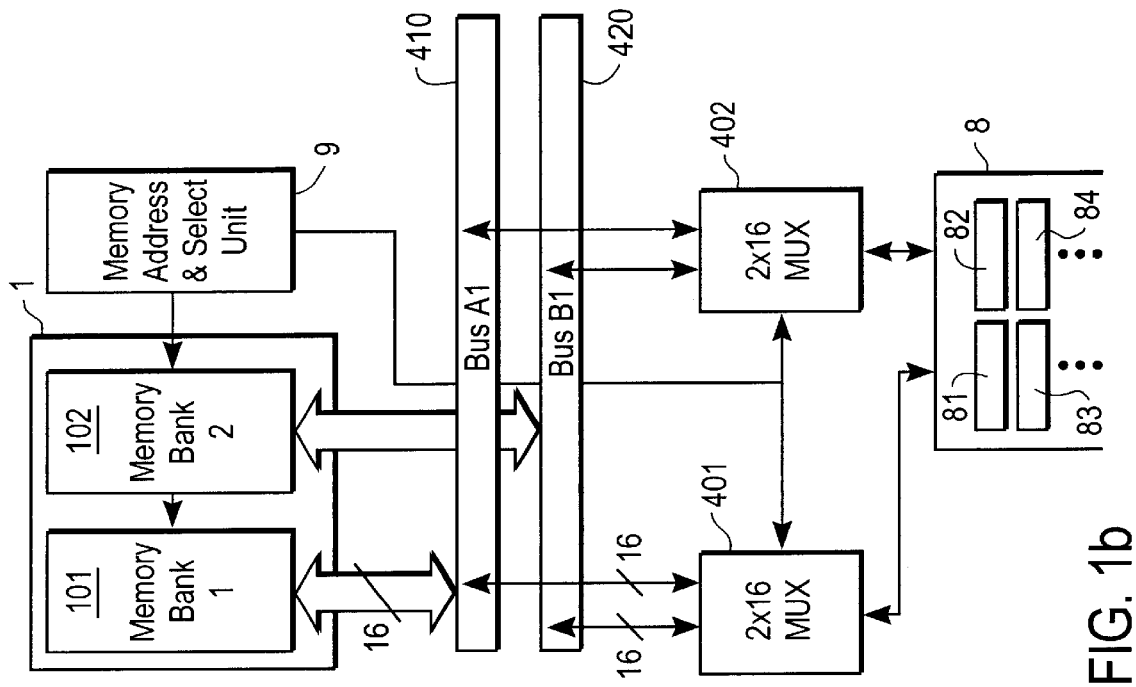
FIGS. 1a and 1b show a block diagram of first embodiments including a memory sub-system, a coupling interface and a register file according to the present invention.
Figure 1A:
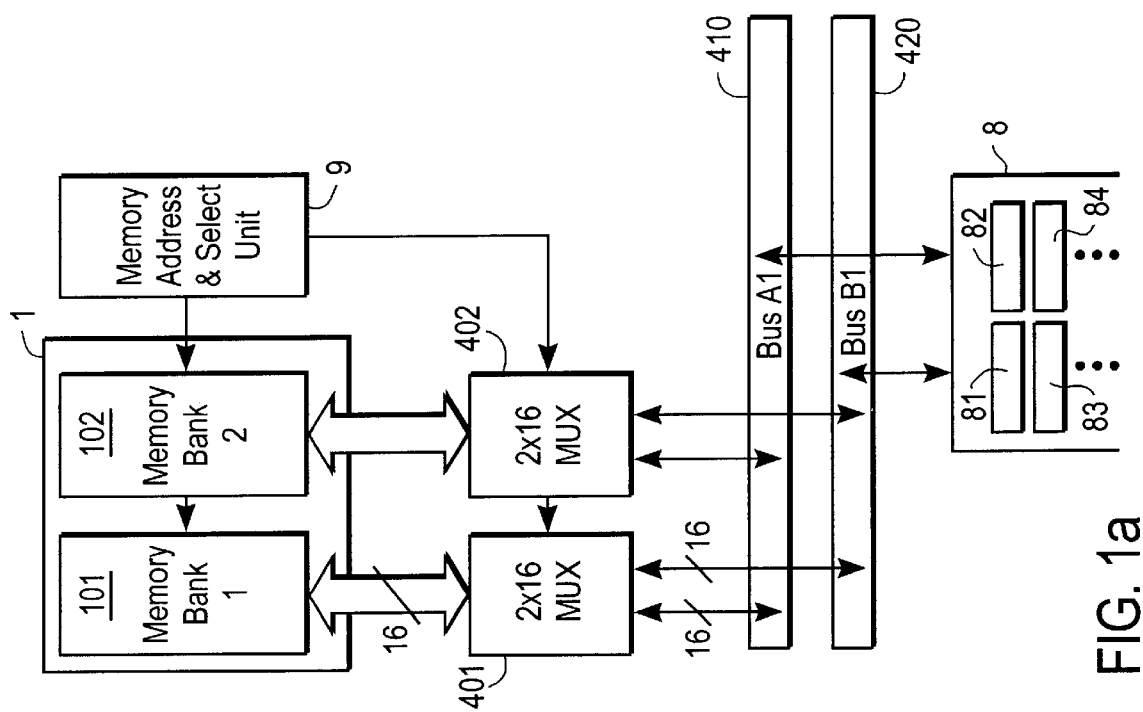

FIG. 1a shows an embodiment of simple implementation of the principles according to the present invention. A memory sub-system contains two memory banks 101 and 102. Throughout the application, memory bank means a memory block containing either multiple banks or towers organized in one or more data bytes or a single memory organized in multiple bytes. Thereby, the memory sub-system can be either cache memory or standard memory. The memory banks 101 and 102 are addressed and selected by a memory address and select unit 9. Each memory bank outputs 16 bit data at its respective data input/output port. The output ports are coupled with the input of 2×16 multiplexers 401, 402, respectively. Each multiplexer 401 and 402 comprises two 16 bit outputs which are coupled with 16 bit sub-busses 410 and 420. The multiplexers are controlled by memory address and select unit 9. A register file 8 is provided which contains a plurality of 16 bit registers 81, 82, 83, 84, . . . Register file 8 is organized in a way, that two registers are accessible in parallel. Register file 8 is coupled with both 16 bit sub-busses 410 and 420.

FIG. 1b is functional identical to FIG. 1a. Here, the multiplexers 401 and 402 are placed between the sub-busses 410, 420 and the register file 8. The multiplexers are controlled by memory address and select unit 9.

Both arrangements are capable of transferring two 16 bit words from or to register file 8 to or from memory sub-system 1 in parallel. The register file is organized in such a way that two registers are accessible at the same time, for example, register 81 and register 82 or register 83 and register 84, etc. The multiplexers can perform an alignment in case data to be transferred to the register file 8 is not aligned with memory bank 101. This will be explained in more detail below. Both arrangements can also transfer a single word (16 bit) from one of the two memory banks 101, 102 to any register in the register file 8.

Additional multiplexers in the register file can provide transfer of single bytes in this arrangement. Of course, the whole embodiment can be expanded to a 8 bit sub-bus system using four 8 bit sub-busses and respective multiplexers.

FIG. 2 shows a block diagram of an interface 4 between a register file 8 and a memory subsystem 1 in a microcontroller or microprocessor. The memory sub-system 1 comprises 4 memory banks 101, 102, 103, and 104.

Each memory bank is organized in 16 bits. In other words, each memory bank has a 16-bit data input/output port. A memory address and select unit 9 is provided to select each memory bank individually. Unit 9 also provides the addressing of the memory banks which is usually common for all banks but can be provided individually at least in part as will be explained later.

The interface 4 comprises a bus having four 16-bit sub-busses 410, 420, 430, and 440. Each bus 410, 420, 430, and 440 is bi-directional and connected to bi-directional input/output ports of four multiplexers 401, 402, 403, and 404, respectively. Each multiplexer 401, 402, 403, and 404 couples one of the four sub-busses 410, 420, 430, and 440 with the input/output port of an appropriate memory bank 101, 102, 103, or 104. Register file 8 comprises two banks of registers 810, 820 each having a number of registers. Each register has 32 bits and comprises an upper 16 bit portion 801 and a lower 16 bit portion 802. The upper portion 801 of register bank 810 is coupled with sub-bus 410, the lower portion 802 with sub-bus 420, the upper portion 803 of register bank 820 with sub-bus 430, and the lower portion of register bank 820 with sub-bus 440. For the sake of a better overview the control logic for selecting the sub-busses 410, 420, 430, and 440 and the multiplexers 401, 402, 403, and 404, etc. is not shown in FIG. 2.

The embodiment according to FIG. 2 provides the feature of reading and writing of up to two 32 bit long words or four 16 bit words in parallel from or to the memory sub-system 1. The register file has to be organized in a way that two or more registers are accessible in parallel. For writing two 32 bit long words into the register file memory address and select unit 9 addresses the memory banks 101, 102, 103, and 104. If the data from memory 1 are aligned, then multiplexer 401 selects sub-bus 410, multiplexer 402 selects sub-bus 420, multiplexer 403 selects sub-bus 430, and multiplexer 404 selects sub-bus 440. The register select unit (not shown) select one register in each register bank 810, 820. In another embodiment the same register in each bank 810 and 820 are addressed. Thus two 32 bit long words will be written into the register file in a single cycle. If the data stored in the memory is not aligned, for example, if the two 32 bit long words start in memory bank 102 at address X, followed by the data in banks 103, and 104 at the same address and ending with data stored in memory bank 101 at the address X+8 (with byte-wise addressing), then memory address and select unit addresses memory banks 102, 103, 104 with address X and memory bank 1 with address X+8. The respective outputs are coupled with the register file 8 as follows: Multiplexer 401 couples memory bank 101 with sub-bus 440, multiplexer 402 couples memory bank 102 with sub-bus 410, multiplexer 403 couples memory bank 103 with sub-bus 420, and multiplexer 404 couples memory bank 104 with sub-bus 430. Thus, no matter how the data is stored in memory 1, the interface 4 automatically aligns it for reading or writing in or out of register file 8. This scheme is shown for 16 bit words as the smallest data which can be loaded or stored. Nevertheless, the scheme can be easily adapted to higher or lower data structures, such as 8 bit data or 32 bit data, etc.

The arrangement according to FIG. 2 can also be used to store or load a single 16 bit word from or to memory 1. For example if a 16 bit word is to loaded from memory bank 3 into a upper portion register in register bank 810, then memory address and select unit 9 selects and addresses memory bank 103. The data from the output port of memory bank 3 is coupled with sub-bus 410 through multiplexer 403. The register select logic (not shown) select the proper register out of register bank 810, for example register portion 801.

In embedded application it is often necessary to save as much energy as possible. With the embodiment according to the present invention only the memory bank which contains data to be transferred has to be activated. Also, only the appropriate sub-bus changes. All other busses can remain in their respective status. This can be achieved by so called bus holders as will be explained later. Thus, all other memory bank can be in a quiescent mode. No unnecessary charging of bit and word lines has to be initiated.

FIG. 2 shows the multiplexers or switches between the memory sub-system 1 and the busses 410, 420, 430, and 440. In a different embodiment (not shown) the multiplexers or switches can be placed between the busses 410, 420, 430, and 440 and the register file 8. In yet another embodiment the switches can be on both sides. This is dependent on the implementation and layout of the respective microprocessor or microcontroller.

Figure 3:
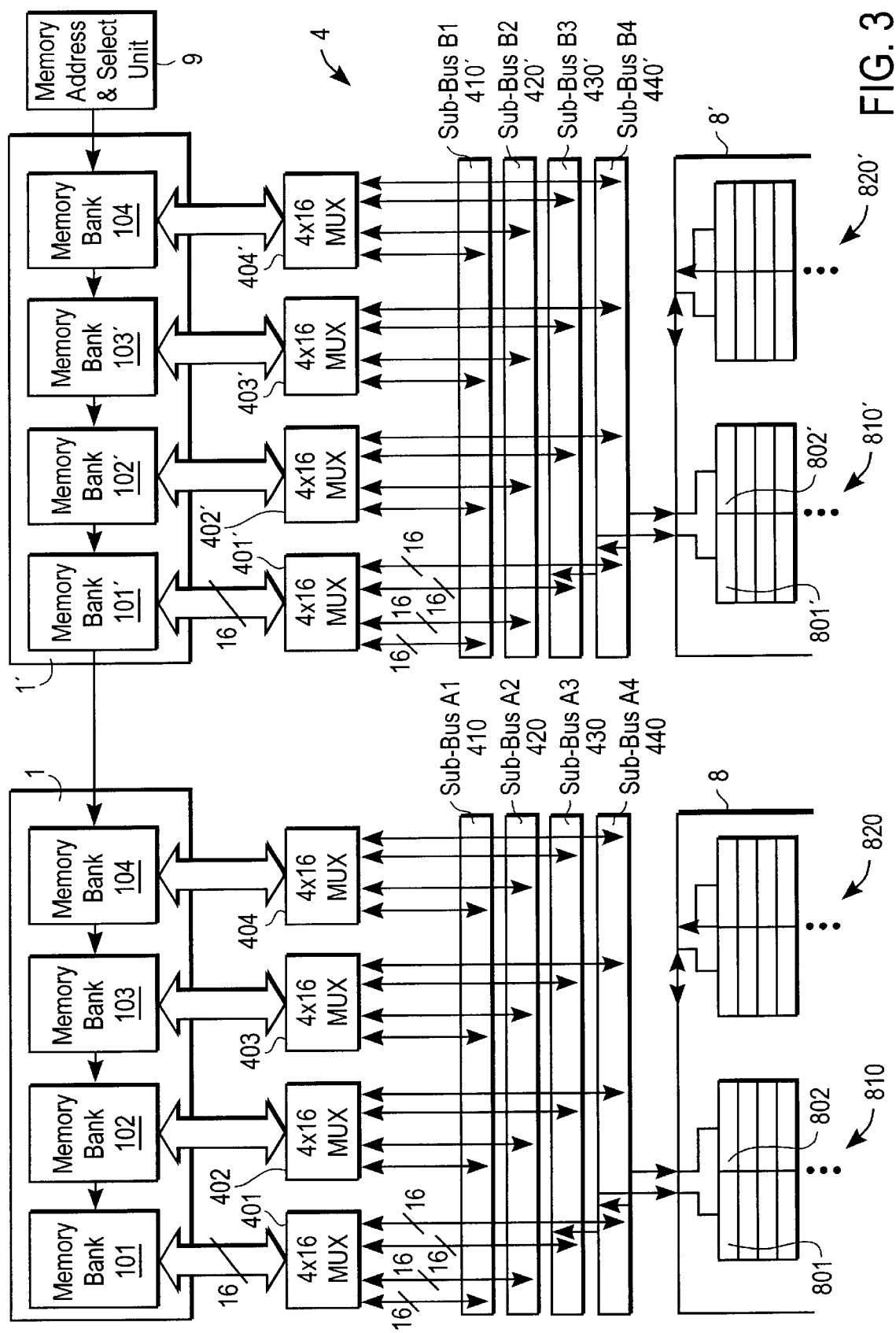
FIG. 3 shows a block diagram of a third embodiment with a memory subsystem coupled with a register file according to the present invention.

FIG. 3 shows an embodiment which is expanded in view of the embodiment shown in FIG. 2. The arrangement of FIG. 2 is simply doubled. Therefore, two memory blocks are provided within memory sub-system 1. Each memory block contains 4 memory banks 101, 102, 103, 104, 101', 102', 103', and 104'. The embodiment also comprises two buses 4 and 4' and respective multiplexers 401, 402, 403, 404, 401', 402', 403', and 404'. Finally, two separate register files 8 and 8' are provided.

This embodiment allows transfer of up to four 32 bit words in parallel. For example, register file 8 can be a address register file and register file 8' a data register file. The transfer of data into the registers takes place in the same manner as described above. Memory subsystem 1 is divided into two separate memory blocks wherein address register file 8 has access only to memory banks 101, 102, 103, and 104 whereas register file 8' has only access to memory banks 101', 102', 103', and 104'. In many application this is not disadvantageous as the central processing unit provides means to transfer data from register file 8 to register file 8' and vice versa.

Figure 4:
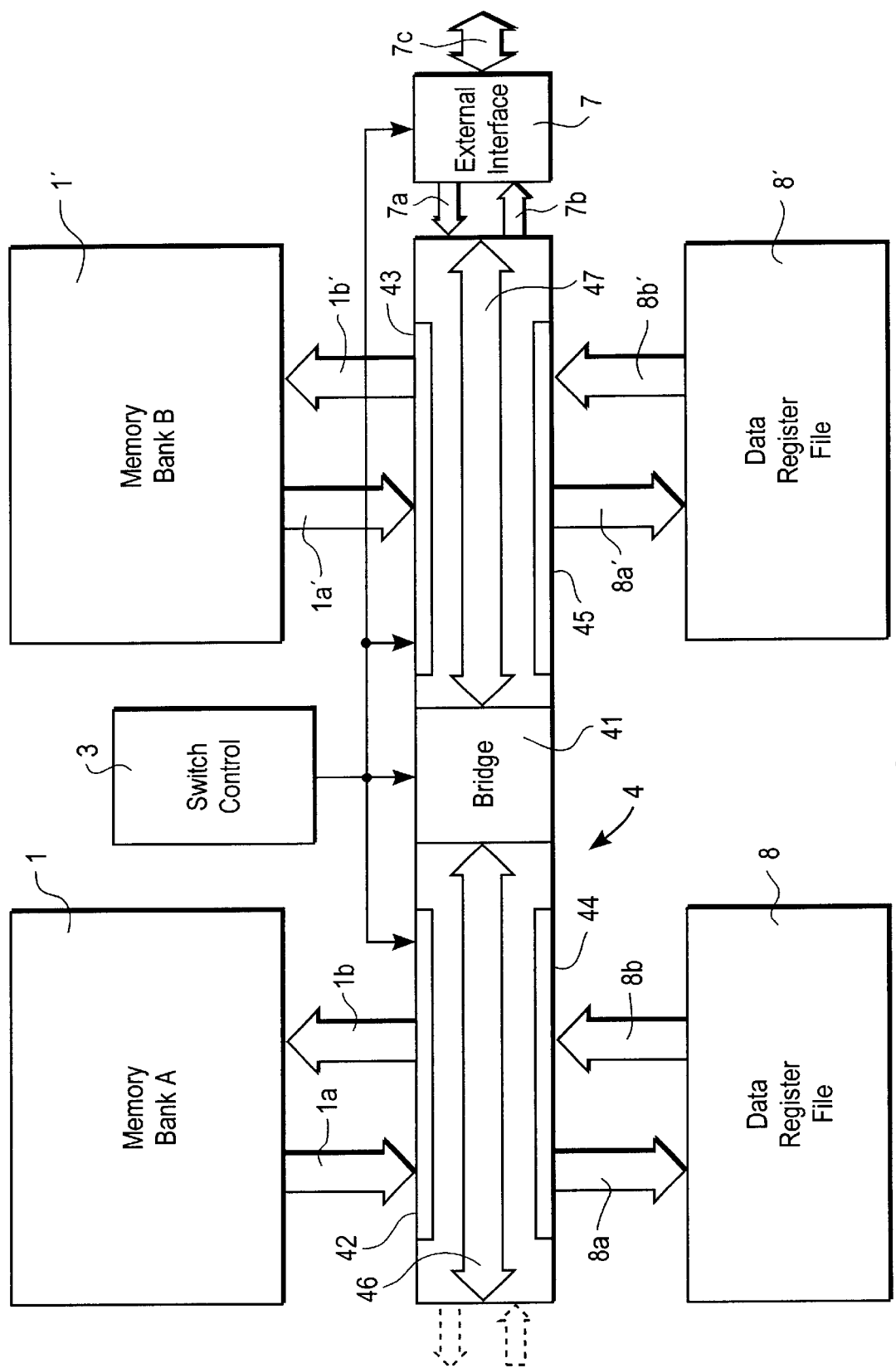
FIG. 4 shows a block diagram of a fourth embodiment with a coupling unit between a memory system and two register files according to the invention.

Nevertheless, to overcome this drawback FIG. 4 shows a third embodiment according to the present invention. In this embodiment a memory block 1 is coupled by a 64 bit read bus 1a and a 64 bit write bus 1b with a coupling unit 42 of a first 64 bit bus 46. Instead of separate read and write busses a single bi-directional bus can be used. The two memory banks can be addressed with either a common address signal generated by a memory address and select unit (not shown) or an individual address signal for each memory bank generated by the memory address and select unit. For this purpose memory address and select unit provides a address incrementer as will be explained later. A second coupling unit 44 couples bus 46 with respective 64 bit read and write buses of an address register file 8. A ' indicates the same elements on the data register file side. Interface 4 comprises a second bus 47 with coupling units 43 and 45. Between the two busses 46 and 47 a bridge is provided. This bridge 41 is controllable and can couple both busses 46 and 47. A switch control unit 3 is provided which controls the coupling units 42, 43, 44, and 45, the bridge 41 and an external interface 7 which can couple external devices through busses 7a, 7b, and 7c.

FIG. 4 shows basically the same elements as FIG. 3. In addition a bridge unit 41 is provided. If this bridge unit 41 is activated by switch control 3, then only up to 2 32 bit long words or 4 16 bit words can be transferred to or from either address register file 8 or data register file 8'. Also, only either memory block 1 or memory block 1' can be source or destination in this mode. On the other hand both memory blocks 1 and 1' can form a single memory with consecutive memory addresses and data can be transferred from any location within this memory to any register in the register files 8 and 8'. Also, the external interface 7 can provide data which can be transferred to either register file. Furthermore, an additional internal interface (not shown), for example, coupled with bus 46 or 47, can be provided to transfer data from or to other on-chip devices. Bridge 41 thereby selects the way the data is routed which can be from or to either internal memory bank 1, 1' to or from the register files 8, 8', the external interface 7 or internal interface. The bridge 41 allows a plurality of combinations. On the other hand, if the bridge 41 is deactivated then the content of two 32 bit registers in the address register file and of two 32 bit registers in the data register file can be transferred within one single cycle from or to the memory subsystem 1, 1'. This is very advantageous in case of a context switch where depending upon implementation the content of a number of registers has to be stored and restored. For example, if a context consists of four data and four address registers a context switch with an embodiment according to FIG. 4 takes only 2 cycles for storing and two cycles for restoring the respective registers.

Figure 5:
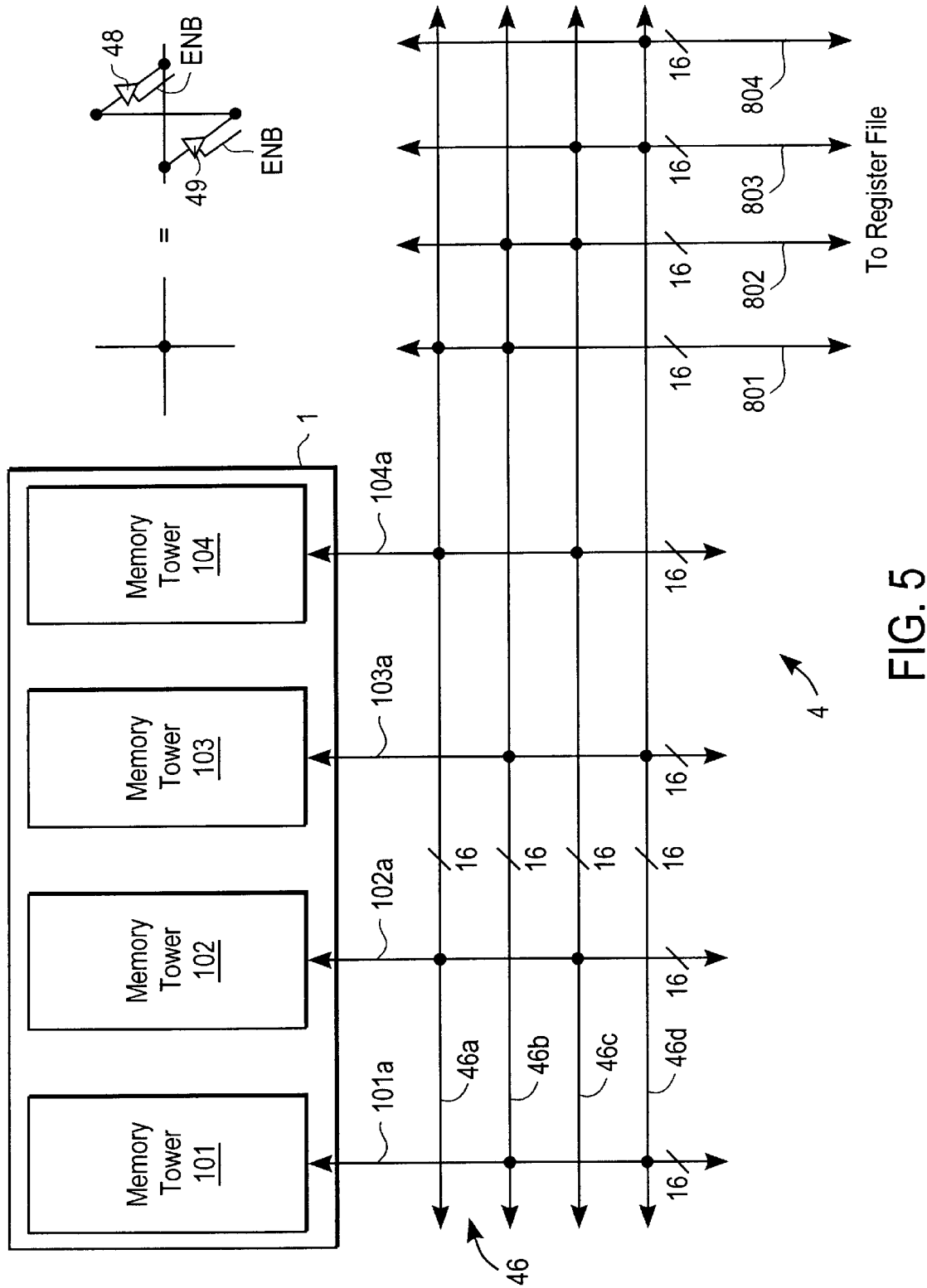
FIG. 5 shows details of the coupling unit coupling multiple banks with a register file.

FIG. 5 shows an embodiment of one side of interface 4 including, for example, coupling units 42, bus 46, and coupling unit 44. Memory block 1 is divided into four memory towers or banks 101, 102, 103, and 104. Bus 46 is divided into four 16 bit sub-busses 46a, 46b, 46c, and 46d. Each memory tower has a 16 bit data input/output port 101a, 102a, 103a, and 104a. Port 101a is coupled with sub-bus 46b and sub-bus 46d. Port 102a is coupled with sub-bus 46a and sub-bus 46c. Port 103a is coupled with sub-bus 46b and sub-bus 46d. Port 104a is coupled with sub-bus 46a and sub-bus 46c. Four 16 bit coupling busses 801, 802, 803, and 804 are provided. Coupling bus 801 is coupled with sub-bus 46a and 46b. Coupling bus 802 is coupled with sub-bus 46b and 46c. Coupling bus 803 is coupled with sub-bus 46c and 46d. Coupling bus 804 is coupled with sub-bus 46d and 46a. Each dot in FIG. 5 indicates a coupling of each of the 16 lines of a port or coupling bus with one of the 16 respective lines of the sub-bus. In the upper right corner of FIG. 5 an embodiment comprising tri-state buffers for a single bus line is shown. The input of a first tri-state driver 48 is connected with one line of an input/output port of memory sub-system 1. Its respective output line is connected to the respective line of bus 46. A second tri-state driver 49 is provided. Its input is connected to the same line of bus 46 and its output is connected with the same port of memory subsystem 1. This embodiment shows bi-directional busses. Of course, unidirectional busses can be used as well.

The connection scheme according to FIG. 5 allows any 16 bit data word to be placed at any of the coupling busses 801, 802, 803, or 804. This scheme can be used instead of the one shown in FIG. 2 or FIG. 3. The principle used here can be expressed also more generally as follows: Memory 1 comprises even and odd memory towers each having a port. The register file 8 comprises a plurality of registers, whereby a number of registers are accessible in parallel. The register file has a bit width which is at least equal to the sum of the bit width of each memory tower port, for example, if four memory towers each having a 16 bit port are used, then the register file 8 comprises at least two 32 bit registers or four 16 bit registers being accessible in parallel. Thereby, the register file interface forms a multiple n-bit interface to said register file. The coupling bus comprises even and odd sub-busses, whereby first couplers are bi-directional tri-state drivers coupling each odd memory tower with each even sub-bus and each even memory tower with each even sub-bus and whereby the second couplers couple the sub-busses with the register file interface in such a way, that said port of any memory tower can be coupled with any n-bit part of said register file interface.

Any other scheme can be used which achieves the same purpose of aligning and distributing data to respective registers in parallel, for example, each memory tower 101, 102, 103, 104 could be selectively coupled with each sub-bus and each coupling bus 801, 802, 803, and 804 would be fixedly coupled with one of the sub-busses 46a, 46b, 46c, 46d, respectively. A further embodiment would provide all selective couplings between coupling busses 801, 802, 803, 804 and the sub-busses 46a, 46b, 46c, 46d and fixed connections between the memory towers 101, 102, 103, 104 and the sub-busses 46a, 46b, 46c, 46d.

If two 32 bit long words are stored unaligned in memory subsystem, for example, the 64 bits begin in memory bank 103, the following alignment takes place. Port 103a is coupled sub-bus 46b, port 104a is coupled with sub-bus 46c, port 101a is coupled with sub-bus 46d, and port 102a is coupled with sub-bus 46a. Furthermore, sub-bus 46b is coupled with coupling bus 801, sub-bus 46c is coupled with coupling bus 802, sub-bus 46d is coupled with coupling bus 803 and sub-bus 46a is coupled with coupling bus 804.

Figure 6:
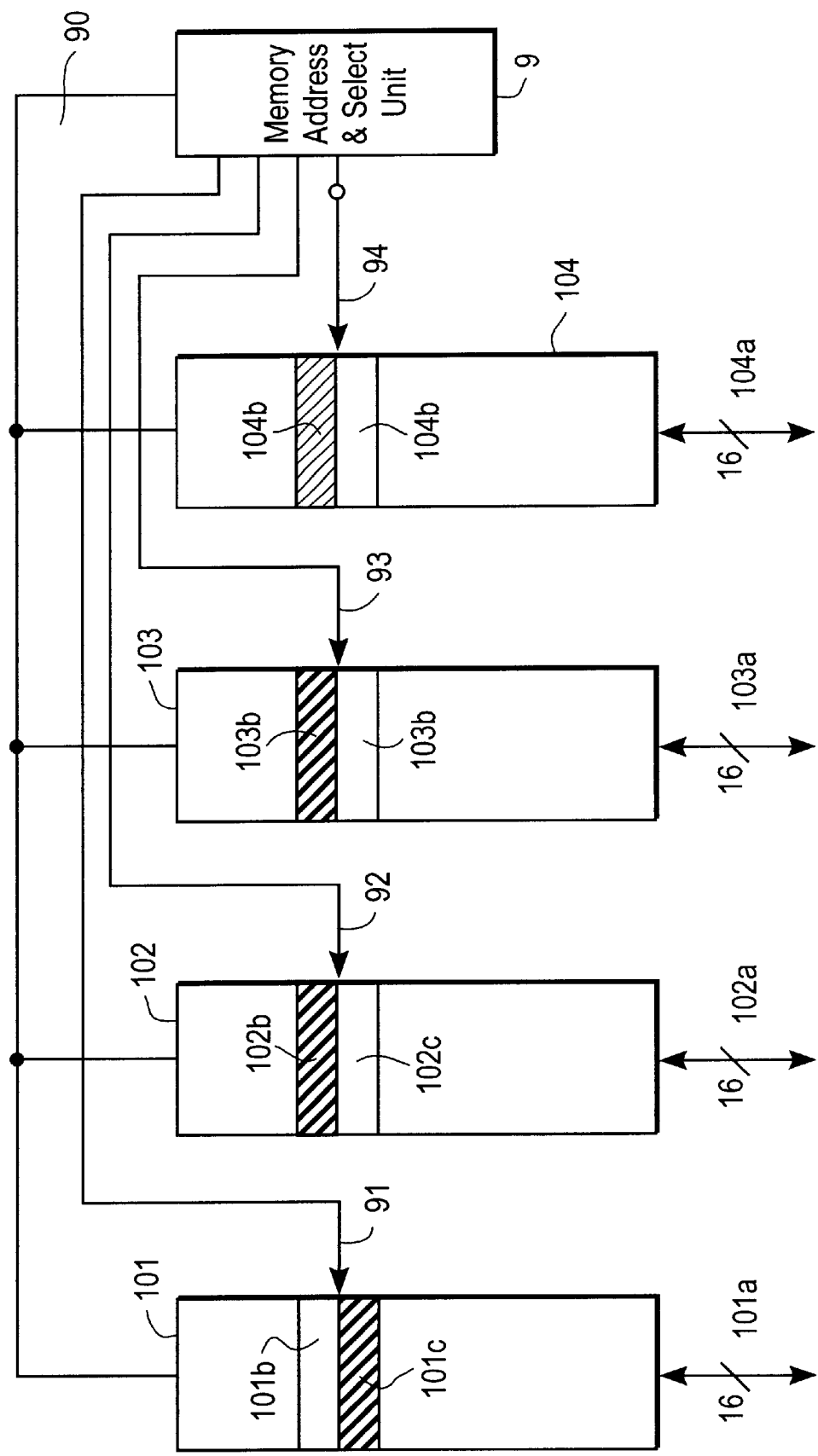
FIG. 6 shows an addressing scheme of a multiple bank memory system.
Figure 7:
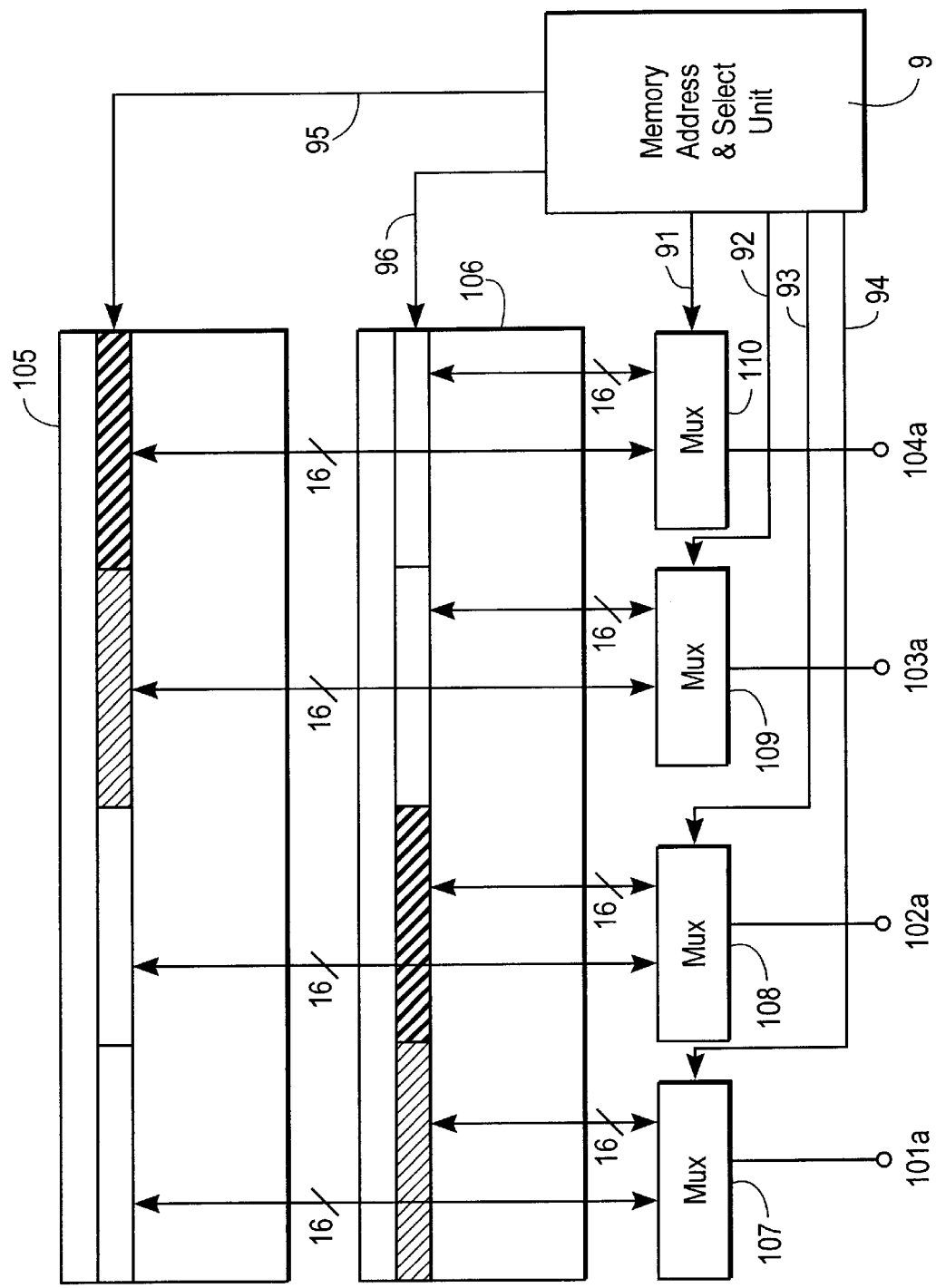
FIG. 7 shows another addressing scheme of a multiple bank memory system.

Usually, all memory banks receive the same address from memory address and select unit 9. Nevertheless, unit 9 can also address each memory bank differently. Of, course this would increase the respective logic and wiring area. Therefore, a simpler access of different memory cells in each memory bank is shown in FIG. 6 and FIG. 7. This access scheme allows access to any unaligned 64 bit data stored within a addressed memory portion of this 4 bank memory block. This type of access is the most common case which usually would need 2 cycles, for example, if a 64 bit data begins in memory bank 102 and ends in memory bank 101, as shown in FIG. 6, then during a first cycle memory banks 102, 103, and 104 would output their data at address X and during a second cycle memory bank 101 outputs its data at address X+8 (bytewise addressing).

FIG. 6 shows an access scheme which allows access of unaligned data in a memory block with a plurality of memory banks within a single cycle. In FIG. 6 are again 4 memory banks 101. 102, 103, and 104 with respective input/output ports 101a, 102a, 103a, and 104a shown. Each bank is addressed by address and select unit 9 by the upper address bit lines 90 which form the main address part of a respective address which addresses a 32 bit data portion of each bank 101, 102, 103, and 104. The 32 bit data portion consists of two 16 bit memory cells 101b, 101c in memory bank 101, 102b, 102c in memory bank 102, 103b, 103c in memory bank 103, and 104b, 104c in memory bank 104.

Data in memory block 1 are stored in a sequential order such that memory cells 101b, 102b, 103b, 104b, 101c, 102c, 103c, 104c, etc. form consecutive memory cells within memory block 1. In other words, memory cells 101b, 102b, 103b, and 104b contain the upper data part and memory cells 101c, 102c, 103c, and 104c contain the lower data part of a 128 bit data word. Special address bit lines 91, 92, 93, 94 are used to select individually upper or lower memory cells in each bank 101, 102, 103, and 104. For example, as shown in FIG. 6, if unaligned 64 bit data start in memory bank 102 and end in memory bank 101 indicated by the shaded memory cells 102b, 103b, 104b, and 101c. Address and select unit 9 selects these memory cells through address lines 90, 91, 92, 93, and 94. Ports 101a, 102a, 103a, and 104a then carry the unaligned 64 bit data word which will be aligned through interface 4 as described above.

FIG. 7 shows a second embodiment of memory block 1. Here, two memory banks 105 and 106 are provided. Each memory bank is organized in 64 bits. Bank 105 contains the "upper/lower" data and is addresses by address lines 95 through memory address and select unit 9 to output 64 bit in parallel. Bank 106 contains the "lower/upper" data and is addressed by address lines 96 through unit 9 to output also 64 bit in parallel. Address lines 95 and 96 can be partly identical, for example only the least significant bit is handled differently. Depending on this least significant bit it is decided whether bank 105 or 106 contains the upper or lower part. Memory address and select unit 9 provides an address incrementer to allow different addresses on address lines 95 and 96. The 64 bit output is fed in four 16 bit portions to four 2×16 multiplexers 107, 108, 109, and 110. The outputs of each multiplexer 101a, 102a, 103a and 104a carry the unaligned 64 bit data from memory 1. The multiplexers are controlled by memory address and select unit 9. The memory banks 105 and 106 are organized in such a way, that data start in the first row of bank 105, continue in the first row of bank 106, followed by row 2 of bank 105 and so on. Again, for example, if unaligned 64 bit data start with the third 16 bit portion in memory bank 105, as indicated by the shadowed memory cells in FIG. 7, unit 9 selects the same memory lines in bank 105 and 106. Through multiplexers 107, 108, 109, and 110 the respective 16 bit portions of bank 105 or bank 106 are selected and fed to output ports 101a, 102a, 103a, and 104a. In this example, multiplexers 109 and 110 select bank 105 and multiplexers 107 and 108 select bank 106. The actual alignment is done by interface 4 as described above.

For writing into the memory banks all memory cells must be accessible individually. This is important because in case of a scenario shown in FIG. 7 the non shaded memory cells must not be overwritten during a write access. Therefore, address lines 95 and 96 must provide select lines for each memory cell within a row of memory banks 105 and 106.

As can be seen to anybody skilled in the art, there are numerous ways to organize memory banks and to form output ports for the memory sub-system by means of multiplexers or tri-state drivers, etc.

FIG. 8 shows an embodiment of the bridge unit 41 shown in FIG. 4. Bus 46 and 47 each are divided into four 16 bit sub-busses. Each line of each sub-bus of bus 46 is coupled with the respective line of bus 47 by means of two tri-state drivers. FIG. 8 shows only drivers for one of sixteen lines for each sub-bus. The tri-state driver pairs 450, 451; 460, 461; 470, 471; 480, 481 each form a selectable bi-directional coupling element. Each driver either functions as a read or write driver depending on the source and destination of the respective data. The upper or lower drivers of each line can be enabled commonly or separately for each 16 bit sub-bus. Thus, different directions for each sub-bus are possible and, for example, 32 bit data can be written from memory block 1 to the data register 8' and 32 bit data from memory 1' to address register file 8. Any other combination is possible depending on the complexity of the bridge unit 41. In most simple embodiments all top drivers 450, 460, 470, and 480 are enabled by a single signal and all bottom drivers 451, 461, 471, and 481 are enabled by a second signal.

Figure 9:
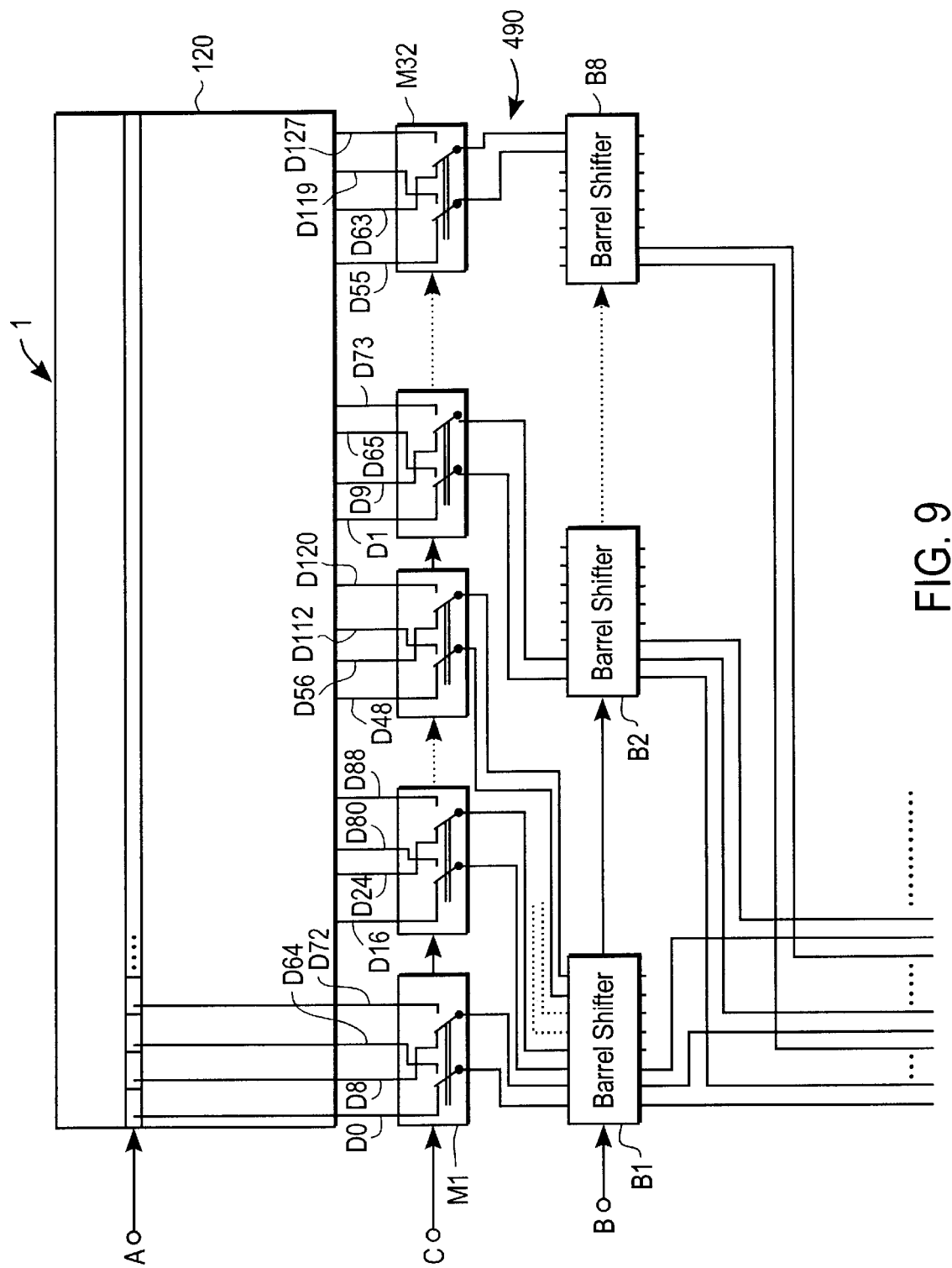
FIG. 9 is a further embodiment showing a memory and a interface of the present invention.

Another embodiment of the memory interface is shown in FIG. 9. In this embodiment only a single memory block 120 is provided. This memory block 120 is organized in 128 bits. The interface between register file and memory consists of 32 double 2×1 multiplexers M1–M32 as primary switches, an intermittent bus 490 and 8 barrel shifters as secondary switches. Each multiplexer M1–M32 contains two 2×1 multiplexers. The multiplexers M1–M32 are individually controlled by control signal C. Each bit cell output of an addressed row of memory block 120 is coupled with an input of a multiplexer M1–M32. 4 multiplexers M1–M4; M5–M8; . . . M29–M32 respectively are coupled with one of 8 barrel shifters B1–B8. The barrel shifters are controlled by signal B. The barrel shifters B1–B8 output 64 bits in parallel which are fed to the register file.

In this embodiment the 128 bits of each row of memory block 120 are not stored in a consecutive order. The bit order starts with bit D0, D8, D64, D72, D16, D24, D80, D88, . . . D48, D56, D112, D120, . . . D55, D63, D119, D127. The order is divided into eight blocks each having four 4 bit groups. The 4 bit groups each carry data bits Dn, Dn+8, Dn+64, Dn+72, wherein n has the order n=0, 16, 32, 48, 1, 17, 33, 49, 2, 18, 34, 50, . . . 7, 23, 39, 55 as shown in FIG. 9. The multiplexers M1-M8 select two data lines out of a 4 bit group, whereby either the first two and or the second two bits are selected, for example, multiplexer M1 selects either data pair D0, D8 or data pair D64, D72. The multiplexers M1–M32 are controlled separately, in other words each double multiplexer M1–M32 is controlled by a different control line. Therefore, control signal C consists of at least 32 control lines. The output of all multiplexers form a 64 bit bus 490. Eight 8-Bit barrel shifters B1–B8 form the secondary switches which switch the data on the 64 bit lines of bus 490. Each barrel shifter performs a left shift in increments of two bit depending on the control signal B which is formed by respective address signals.

The alignment function of such an arrangement is explained by means of the following example. Assuming the memory block base address is 0, each row address starts at a multiple of m×128, with m=0, 1, 2, 3, . . . Further assuming a 64 bit word is to be loaded from address 262. The respective data is stored in the third row, starting at the second word or at the third byte. Memory address and select unit (not shown) generate select signal A which selects the third row of memory 120. Thus, all 128 bits of this memory row are fed to the inputs of multiplexers M1–M32. A switch control unit (not shown), which may be part of memory address and select unit, selects the second data pair of multiplexers M1, M5, M9, M13, M17, . . . M29 and the first data pair of all other multiplexers. Thus, the input of barrel shifter B1 receives the following data signals: D64, D72, D16, D24, D32, D40, D48, and D56. Signal B is common for all eight barrel shifters and indicates in this example to shift the data byte by one step. As mentioned above, one step is equal to a left shift by two bits. Therefore, the output of barrel shifter B1 carries signals D16, D24, D32, D40, D48, D56, D64, D72. Even so the output of the barrel shifters B1–B8 are not in the right order, there is a fixed relationship between each output line. Thus, no additional switching is necessary. To bring the single bits into the right order only the wiring has to be changed as indicated in FIG. 9. The wiring selects the first bits of each barrel shifter B1–B9, followed by the second bits of each barrel shifter B1–B9, etc. Thus, the register file receives a data word which is the aligned 64 bit word starting with bit D16, D17, D18, . . . D79.

If access to data is only allowed on 16 bit boundaries less control lines C and B are needed. In such an arrangement 16 four bit groups coupled with the multiplexers M1, . . . , M32 would have the same settings allowing to reduce the number of control lines C respectively. Also, the barrel shifters B1, . . . , B8 would only need to shift by 16 bit thus reducing the number of control lines B.

The principle of this embodiment is to provide multiplexers as first switches which select a predefined number of bits from the data provided by the memory in parallel to the respective internal bus. The second switch is used to bring the extracted bits in a predefined order. The second switch does not necessarily reduce the number of bits but does reorder the bits so that the relation of each consecutive bit is constant.

The order of consecutive bits stored in the memory can be arranged in many different ways and does not have to follow the order of the embodiment. Principle of the present invention is to interleave or scramble the bytes, words, or long words stored in memory in an appropriate manner. Thus, a local multiplexing can select the respective data bits. However, the write enable signal has to be also interleaved to access the respective memory cells during a write cycle. For example, the write enable signal for the first byte has to go to bit 0, 1, 2, 3, . . . 7 which are not in consecutive order.

The barrel shifter can of course be realized by multiplexers or in any other known way. The output bit lines of barrel shifters B1–B8 do not have to be ordered before they are coupled with the register file. Depending on the size of each register this can also be done between the register file and the execution units as only execution units which actually manipulate the content of a register need the content of a data byte or word in order. Nevertheless, in a 32 bit microcomputer with 32 bit registers where a register might store 4 bytes, 2 words or 1 long word, it is advantageous to order the bits fed from the interface to the register file. Also, any conventional memory, externally or internally, can be used as the bit order in the memory is of no concern as long reading and writing lines use the same order. Thus, in case of a dual port memory with different port orders, a rewiring on either port has to be performed to ensure proper order of the memory content.

Figure 10:
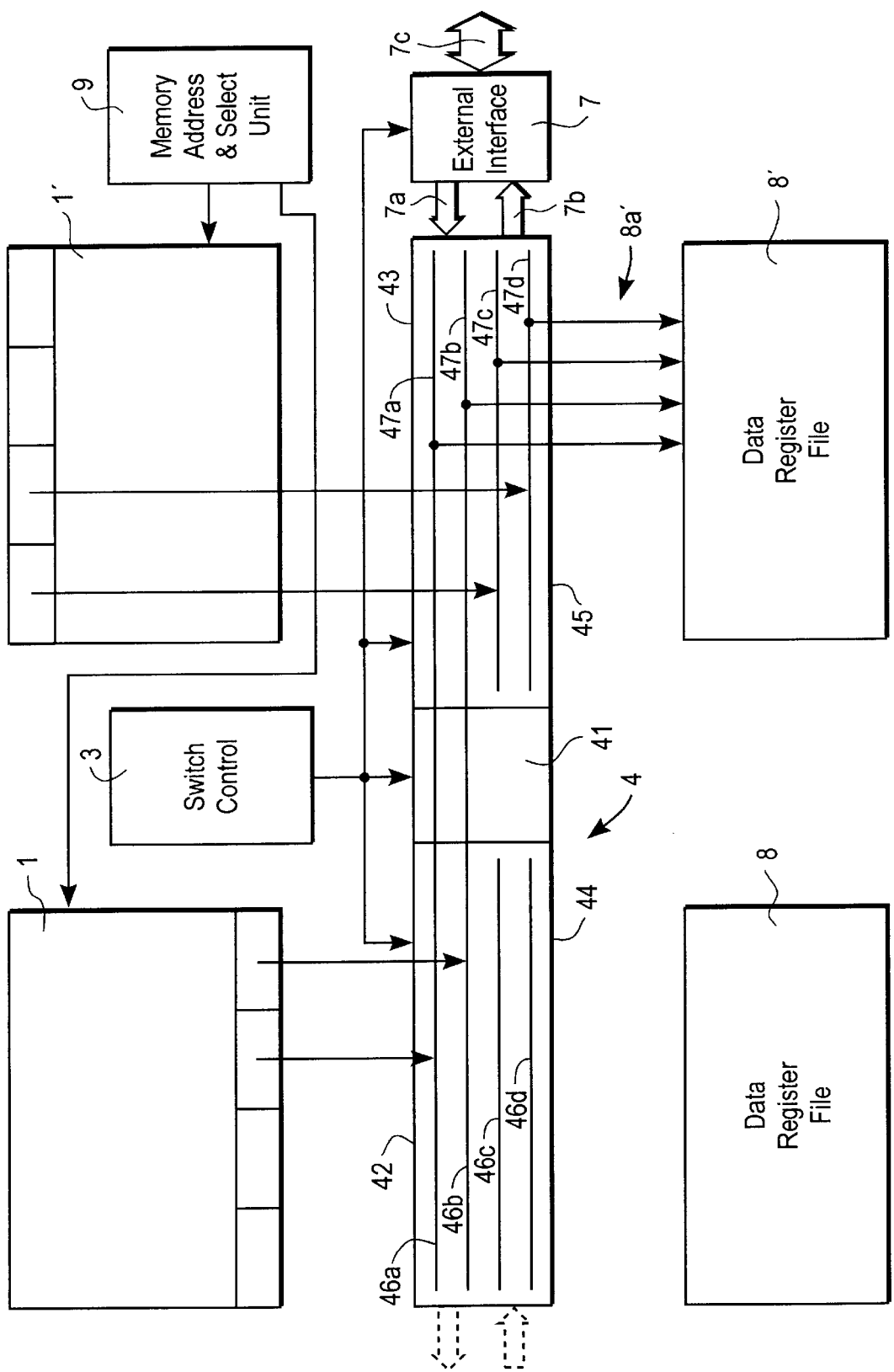
FIG. 10 shows a data transfer of a first type using the embodiment of FIG. 4.

FIG. 10 shows a data transfer using the embodiment of FIG. 4. Both memory banks are addressed by the same address signal generated by memory address and select unit 9. Each memory bank has a four 16 Bit-word wide interface, for example 64 bits. Bus 46 and bus 47 each consist of four 16 Bit wide sub-busses 46a, 46b, 46c, 46d and 47a, 47b, 47c, 47d, respectively. If all four 16 Bit words are to be transferred from one memory bank to one of the register files 8, 8' the transfer takes place with or without usage of bridge 41. In case of a boundary crossing data from both memory banks have to be transferred into one register file. This scenario is shown in FIG. 10. The first two 16 Bit words are stored at the last two memory positions of the first memory bank 1 and the following two 16 Bit words are stored within the second memory bank 1'. In this scenario the content of the last two memory cells of the first memory bank are transferred on sub-bus 46a and 46b. Bridge 41 couples sub-bus 46a with 47a and sub-bus 46b with 47b. The second two 16 Bit words are transferred from the first two memory cells within the second memory bank 1' onto sub-bus 47c and 47d, respectively. Through coupling bus 8a' the four 16 Bit words are transferred into register file 8'.

Figure 11:
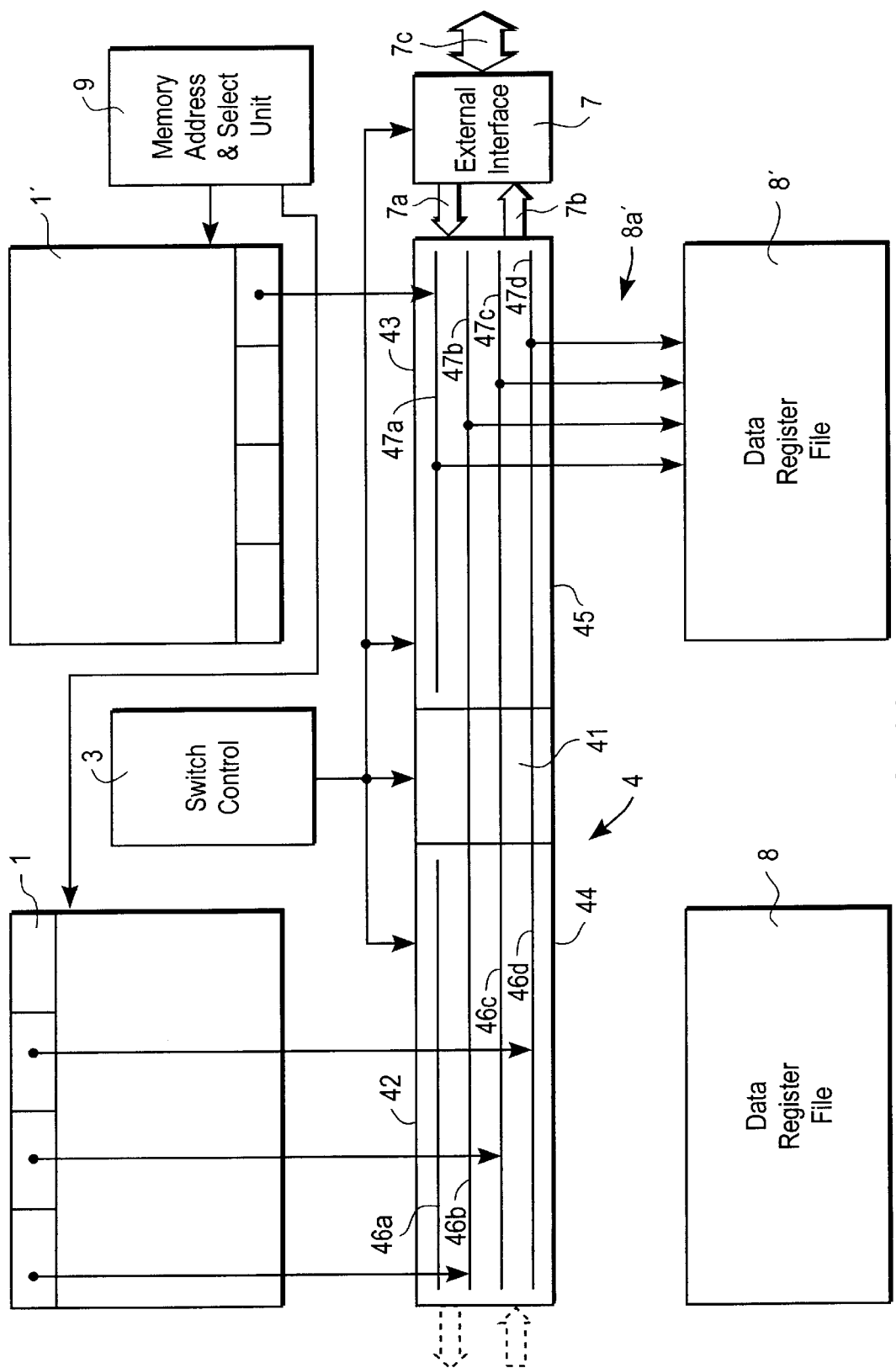
FIG. 11 shows a data transfer of a second type using the embodiment of FIG. 4.

FIG. 11 depicts a second scenario in which a crossing from the second memory bank 1' to the first memory bank 1 takes place. In this scenario memory address and select unit 9 has to provide different addresses for each memory bank. Therefore, memory address and select unit 9 comprises an address incrementer to increment an address provided, for example, to memory bank 1' for memory bank 1. If, for example, four 16 Bit words are stored within the memory under an address, that, for example, the first 16 Bit word is stored in the last memory cell in one row of the second memory bank 1', then the succeeding memory cells are located under a succeeding address in the first memory bank 1. The incrementer increments the address, in this example by 64, and provides the first memory bank 1 with the incremented address. The content of the last memory cell of the addressed row in the second memory bank 1' is transferred on sub-busses 47a. The content of the first three memory cells of the row of the first memory bank 1 addressed by the incremented address are transferred to sub-busses 46b, 46c, and 46d, through the bridge to sub-busses 47b, 47c and 47d. The transfer to register file 8' takes place in the same manner as described above.

Figure 12:
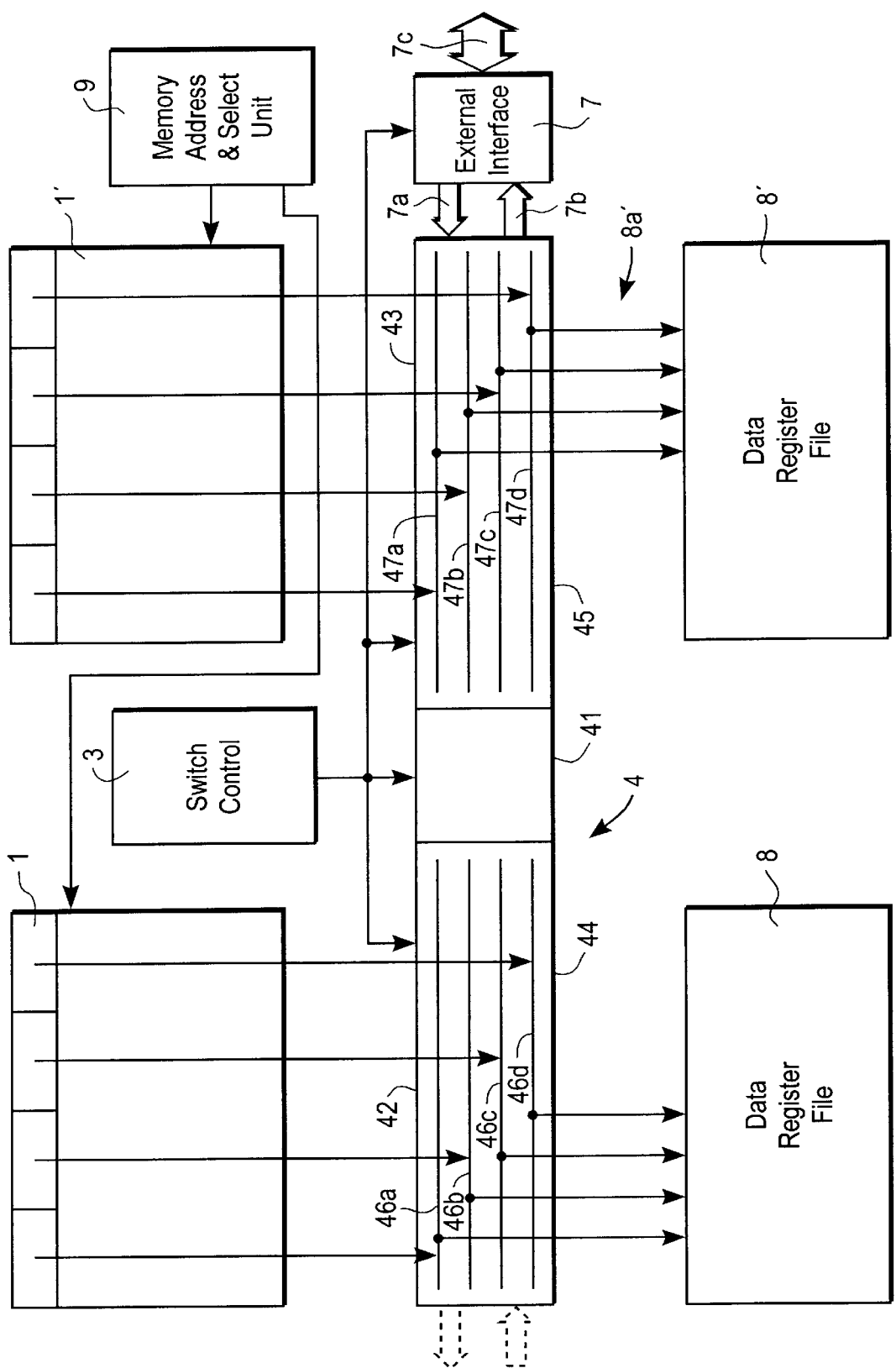
FIG. 12 shows a context switch data transfer using the embodiment of FIG. 4.

FIG. 12 depicts a third scenario in which, for example, a context switch takes place. The purpose of such a transfer is to load or store the content of a context represented by the content of a plurality of registers as quickly as possible. During such a data transfer the bridge 41 completely de-couples busses 42 from busses 43. Thus, 64 bit from memory bank 1 can be transferred to register file 8 in parallel with 64 bits from memory bank 1' to register file 8' or vice versa. Therefore, memory address and select unit 9 addresses both memory banks 1 and 1' with usually the same address were the context content is stored or is to be stored to. External or internal interfaces are usually also de-coupled during such a process. In the shown example four 32 bit words, two in each memory bank, would be transferred from/to memory 1, 1' to/from register files 8, 8' in parallel allowing very fast switching from one task to another. In this example, in a 32 bit microprocessor or microcontroller, a context consisting of four 32 bit words could be stored or restored in a single cycle.

FIGS. 10, 11, and 12 do not show the couplers 42, 43, 44, and 45 according to FIG. 4. for a better overview, only the different data paths are shown.

The above described procedure allows aligned and unaligned data transfer from and two the memory banks 1, 1' to and from the register files 8, 8' without any penalty cycle. Thus, fast transfer of multiple data from or to the memory sub-system is possible.

Figures 13, 14:
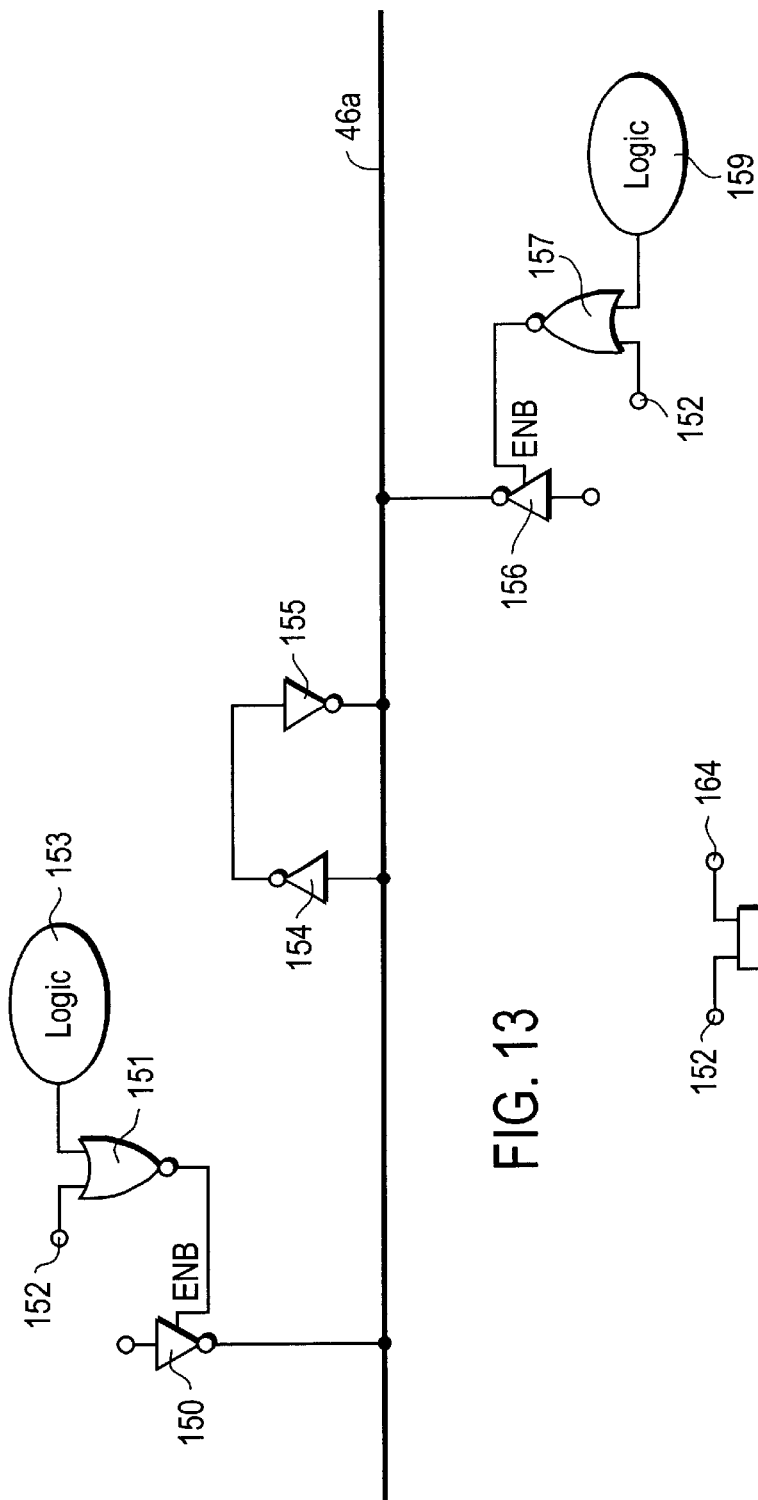
FIG. 13 shows a single bus line structure with a bus holder.
FIG. 14 shows a different embodiment of a bus holder.

FIG. 13 shows an embodiment of a single bus line, for example, bus line 46a. Transfer from memory or register file to the busline 46a is established via two tristate inverters 150 and 156. A simple logic consisting of NOR gate 151 and 157 controlled by a clock signal 152 and respective logic signals 153 and 158 controls drivers 150 and 152. If the drivers 150 and 156 are not enabled a special bus holder arrangement secures the status of the bus line in a defined manner. The bus holder consists of a first inverter 154 whose input is coupled with bus line 46a and whose output is coupled with the input of a second inverter 155 whose output is coupled with bus line 46*a*. Inverter 155 is preferably weak to avoid a unnecessary load on the bus line for one of the drivers 150 or 156. Such an arrangement avoids congestion problems on a bus line as the bus line is only actively driven during the low phase of the clock signal 152. During the high phase of the clock signal 152 drivers 150 and 156 are disabled. Thus, an improved signal flow can be achieved.

FIG. 14 shows an improvement of the bus holder. Again, a first inverter 160 is coupled with a second inverter 161 in series to hold a signal on a bus line. Here, the second inverter 161 is a strong driver but switched. This driver is only active when the clock signal 152 is high and no other driver is active. These two conditions are anded by an AND gate 162 whose output controls driver 161.

What is claimed is:

1. Data processing unit comprising a first and a second register file having a plurality of registers, a first and second memory each having a plurality of n-bit input/output ports, a first bus having a bus width of at least 2n-bits forming at least a first and second sub-bus, first couplers for coupling each port of said first memory selectively with one of said sub-busses, second couplers for coupling said first register file with said first bus, a second bus having a bus width of at least 2n-bits forming at least a third and fourth sub-bus, third couplers for coupling each port of said second memory selectively with one of said sub-busses, fourth couplers for coupling said second register file with said second bus, and a bus-coupler for coupling said first and second bus.

2. Data processing unit according to claim 1, wherein said memories having a plurality of memory banks.

3. Data processing unit according to claim 2, wherein said memories comprise a plurality of memory banks and depending on an access type, a memory address and select unit only selects the memory bank needed for the respective access.

4. Data processing unit according to claim 1, wherein a memory address and select unit controls single byte, word or multiple byte access.

5. Data processing unit according to claim 1, wherein said first and third couplers comprise tri-state buffers for coupling the output lines of said ports with respective lines of said first or second bus.

6. Data processing unit according to claim 1, wherein said first and third couplers comprise multiplexers for coupling the output lines of said ports with respective lines of said first or second bus.

7. Data processing unit comprising a first and a second register file having a plurality of registers, a first and second memory each having a plurality of n-bit input/output ports, a first bus having a bus width of at least 2n-bits forming at least a first and second sub-bus, first couplers for coupling each port of said first memory selectively with one of said sub-busses, second couplers for coupling said first register file with said first bus, a second bus having a bus width of at least 2n-bits forming at least a third and fourth sub-bus, third couplers for coupling each port of said second memory selectively with one of said sub-busses, fourth couplers for coupling said second register file with said second bus, and a bus-coupler for coupling said first and second bus, wherein said memories having a plurality of memory banks, and wherein said memory address and select unit controls single byte, word or multiple byte access, and wherein said memories having a plurality of memory banks, wherein said second and fourth couplers comprise an alignment unit which based upon said access type couples either said first or second bus with a plurality of selectable registers of said first or second register file in parallel or one of said sub-busses with a selectable register of one of said register files.

8. Data processing unit comprising a first and a second register file having a plurality of registers, a first and second memory each having a plurality of n-bit input/output ports, a first bus having a bus width of at least 2n-bits forming at least a first and second sub-bus, first couplers for coupling each port of said first memory selectively with one of said sub-busses, second couplers for coupling said first register file with said first bus, a second bus having a bus width of at least 2n-bits forming at least a third and fourth sub-bus, third couplers for coupling each port of said second memory selectively with one of said sub-busses, fourth couplers for coupling said second register file with said second bus, and a bus-coupler for coupling said first and second bus, wherein said first or second register file comprises a plurality of registers, whereby a number of registers being accessible in parallel, said registers having a combined bit width which is at least equal to the sum of the bit width of each port in said first or second memory, thereby forming a multiple n-bit interface to said first or second register file.

9. Data processing unit comprising a first and a second register file having a plurality of registers, a first and second memory each having a plurality of n-bit input/output ports, a first bus having a bus width of at least 2n-bits forming at least a first and second sub-bus, first couplers for coupling each port of said first memory selectively with one of said sub-busses, second couplers for coupling said first register file with said first bus, a second bus having a bus width of at least 2n-bits forming at least a third and fourth sub-bus, third couplers for coupling each port of said second memory selectively with one of said sub-busses, fourth couplers for coupling said second register file with said second bus, and a bus-coupler for coupling said first and second bus, wherein said memories having a plurality of memory banks, and wherein said memories comprise a plurality of memory banks and depending on an access type, a memory address and select unit only selects the memory bank needed for the respective access, said first or second memory comprises even and odd memory banks and said first or second bus comprises even and odd sub-busses, whereby first couplers are bi-directional tri-state drivers coupling each odd memory bank with each even sub-bus and each even memory bank with each even sub-bus and whereby the second and fourth couplers couple the sub-busses with the first or second register file interface in such a way, that said port of any memory bank can be coupled with any n-bit part of said first or second register file interface.

10. Data processing unit comprising a first and a second register file having a plurality of registers, a first and second memory each having a plurality of n-bit input/output ports, a first bus having a bus width of at least 2n-bits forming at least a first and second sub-bus, first couplers for coupling each port of said first memory selectively with one of said sub-busses, second couplers for coupling said first register file with said first bus, a second bus having a bus width of at least 2n-bits forming at least a third and fourth sub-bus, third couplers for coupling each port of said second memory selectively with one of said sub-busses, fourth couplers for coupling said second register file with said second bus, and a bus-coupler for coupling said first and second bus, wherein said first or second memory comprises a plurality of memory banks, wherein each bank comprises a memory input/output port having a n-byte width, whereby 2n-bytes data are addressed by said address and select unit in each memory bank and further select lines select one of the two n-byte data to be output at said port.

11. Data processing unit comprising a first and a second register file having a plurality of registers, a first and second memory each having a plurality of n-bit input/output ports, a first bus having a bus width of at least 2n-bits forming at least a first and second sub-bus, first couplers for coupling each port of said first memory selectively with one of said sub-busses, second couplers for coupling said first register file with said first bus, a second bus having a bus width of at least 2n-bits forming at least a third and fourth sub-bus, third couplers for coupling each port of said second memory selectively with one of said sub-busses, fourth couplers for coupling said second register file with said second bus, and a bus-coupler for coupling said first and second bus, wherein said first or second memory comprises a plurality of memory banks each organized to output a memory row having multiple n-bytes, and multiple multiplexers to select for each n-byte portion one of said memory banks.

12. Data processing unit comprising a first and a second register file having a plurality of registers, a first and second memory each having a plurality of n-bit input/output ports, a first bus having a bus width of at least 2n-bits forming at least a first and second sub-bus, first couplers for coupling each port of said first memory selectively with one of said sub-busses, second couplers for coupling said first register file with said first bus, a second bus having a bus width of at least 2n-bits forming at least a third and fourth sub-bus, third couplers for coupling each port of said second memory selectively with one of said sub-busses, fourth couplers for coupling said second register file with said second bus, and a bus-coupler for coupling said first and second bus, wherein first and third couplers select a predefined number of bits equal to the number of bits of said bus and the second and fourth couplers reorder the selected bits from said bus.

13. Data processing unit according to claim 12, wherein said first and second memory each comprise at least four n-bit ports and the first and second couplers couple 2n-bits of said memory with said first and second bus and said third and fourth couplers comprise a plurality of barrel shifters being controlled by an address signal.

14. Data processing unit comprising a first and a second register file having a plurality of registers, a first and second memory each having a plurality of n-bit input/output ports, a first bus having a bus width of at least 2n-bits forming at least a first and second sub-bus, first couplers for coupling each port of said first memory selectively with one of said sub-busses, second couplers for coupling said first register file with said first bus, a second bus having a bus width of at least 2n-bits forming at least a third and fourth sub-bus, third couplers for coupling each port of said second memory selectively with one of said sub-busses, fourth couplers for coupling said second register file with said second bus, and a bus-coupler for coupling said first and second bus, wherein said busses comprise a plurality of bus lines and at least one bus line is coupled with a bus holder.

15. Data processing unit according to claim 14, wherein said bus holder comprises a first and a second inverter coupled in series, whereby the input of said first inverter and the output of said second inverter are coupled with said bus line.

16. Data processing unit according to claim 15, wherein said second inverter is weaker than said first inverter.

* * * * *